United States Patent [19]

Zdeb

[11] 4,069,902
[45] Jan. 24, 1978

[54] REVERSIBLE RATCHET LOADBINDER

[75] Inventor: Brian D. Zdeb, Round Lake Park, Ill.

[73] Assignee: MacLean-Fogg Lock Nut Co., Mundelein, Ill.

[21] Appl. No.: 682,736

[22] Filed: May 3, 1976

[51] Int. Cl.² ............................................. F16D 11/00
[52] U.S. Cl. ...................................... 192/43; 254/111;
192/43.2; 81/63.2; 74/577 S
[58] Field of Search .................. 74/575, 577 S, 577 R,
74/578; 254/111; 192/43.1, 43.2; 81/62, 63,
63.1, 63.2

[56] References Cited

U.S. PATENT DOCUMENTS

| | | | |
|---|---|---|---|
| 2,536,172 | 1/1951 | Halperin | 81/63.2 |
| 2,993,396 | 7/1961 | Lenci | 81/63 |
| 3,338,359 | 8/1967 | Baillie | 192/43.1 |

*Primary Examiner*—Alan Cohan

*Attorney, Agent, or Firm*—Mason, Kolehmainen, Rathburn & Wyss

[57] ABSTRACT

Novel ratchet loadbinder apparatus utilizing a spring-biased single pawl member carried within a slotted cam formed on the loadbinder's handle, the pawl member being selectively and reversibly positioned in one of two operating positions formed by bearing recesses at both ends of the slotted cam, such selective placement depending upon the desired direction of movement of an associated screw-threaded turnbuckle barrel. The loadbinder's handle carries a spring member utilized to maintain the pawl member in its preselected position during indexing handle movements. During working stroke handle movements, the pawl member is forcibly interposed between the selected bearing recess on the handle and an associated ratchet gear rigidly mounted on the threaded barrel.

2 Claims, 5 Drawing Figures

U.S. Patent  Jan. 24, 1978  4,069,902
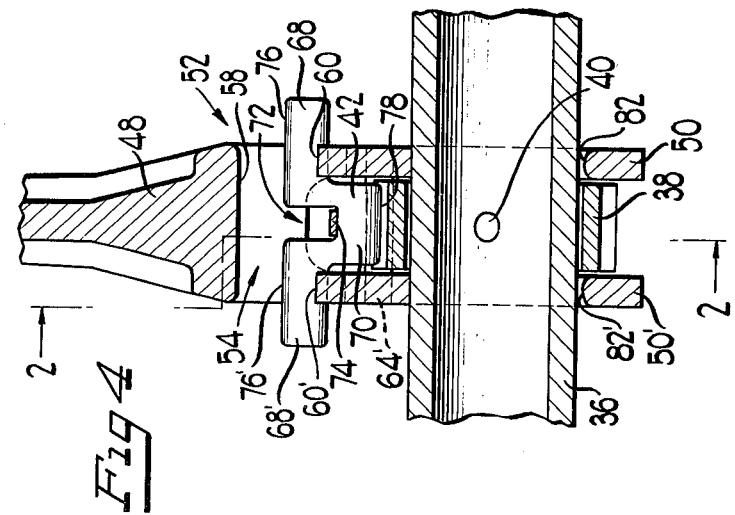
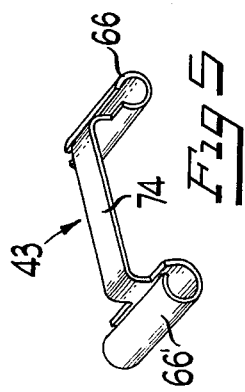
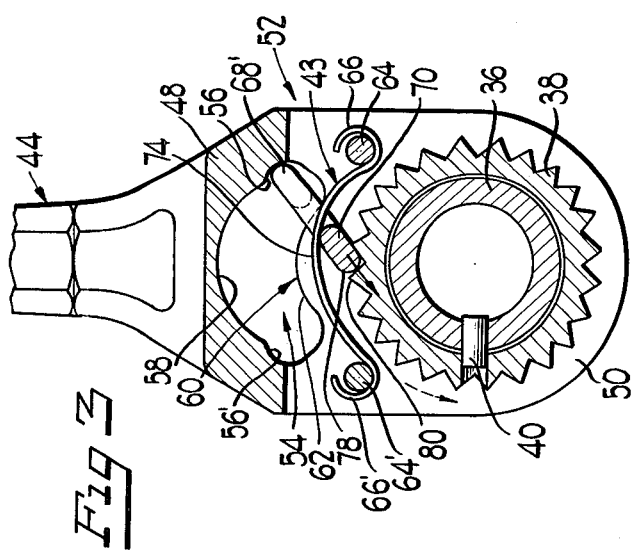
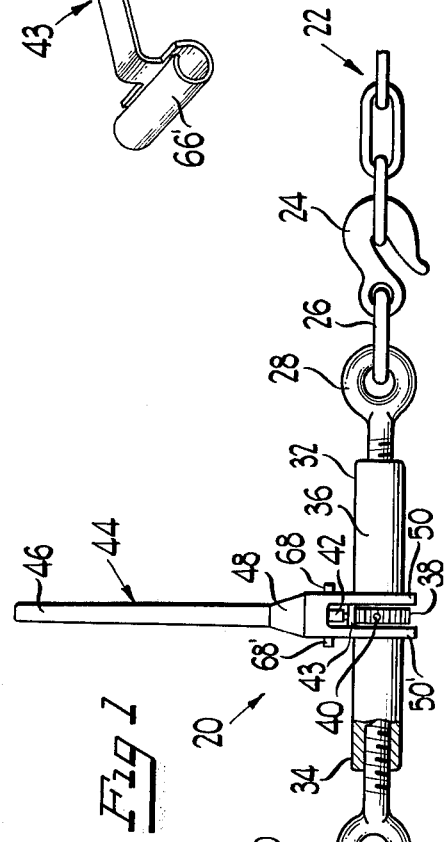
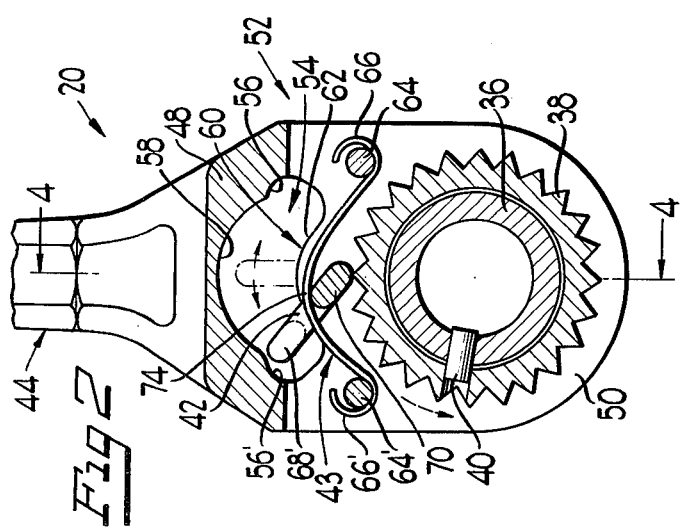
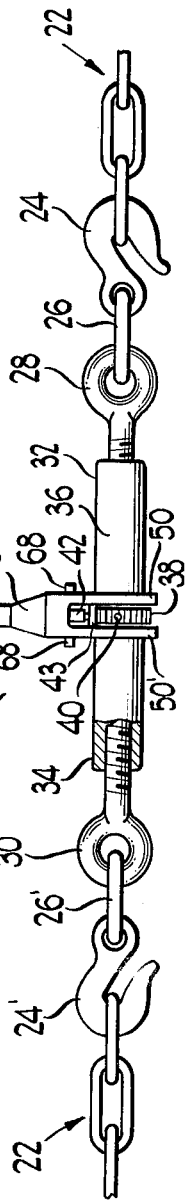

REVERSIBLE RATCHET LOADBINDER

BACKGROUND OF THE INVENTION

1. Field of the Invention

This invention relates to loadbinders and turnbuckles, and more specifically relates to ratchet loadbinders of the type having toothed ratchet wheels and resiliently biased pawl members.

2. Description of the Prior Art

When desiring to draw up and secure lengths of chain, cable, strapping, or other flexible tie members placed about a load, it is well known to utilize some form of ratcheting apparatus wherein oscillating handle movements are transferred into axially directed take up forces. Many prior art loadbinders utilize ratcheting structures including two separate pawl members each carried by the loadbinder's handle, the pawls being respectively interchangeably placed into or out of engagement with the ratchet gear depending upon the action desired. In other prior art devices, single pawl members having two separate pawl heels are utilized wherein rotation of the double-heeled pawl from one operating position to the other effects selectivity of the loadbinder's operating mode. Yet another type of prior art device uses a single pawl member having a single heel capable of being selectively moved from one operating mode to another, but uses not resilient member to assure pawl heel-to-gear engagement during all movements of the associated handle.

So as to counteract the tendency of a pawl, once prepositioned, from being inadvertently moved out of the desired operating position during non-working or indexing stroke handle movements of a loadbinder, most of the prior art devices use some type of structure to prevent such an occurrence or avoid structures for carrying out that function. Many prior art devices exhibit complicated and inefficient spring arrangements due to their particular pawl design. Oftentimes, such spring arrangements caused the spring to deteriorate at a more rapid rate than usual which caused the springs to break during normal use. Other single pawl prior art devices did not use any spring means which resulted in the lack of the necessary flexibility in the pawl member during indexing stroke handle movements, or in the lack of maintaining continuous engagement between the pawl's heel and the ratchet gear.

Another significant fault with prior art ratchet loadbinder devices centered about the fact that, due to their particular indexing mechanism, the teeth of the ratchet wheel were oftentimes undesirably loaded in bending, the result of which often caused cracked gears or broken gear teeth.

SUMMARY OF THE INVENTION

The present invention includes novel structure overcoming many of the above-noted problems of the prior art. In the herein-disclosed invention, a single-ended single pawl member is loosely retained by the loadbinder's handle within a specially formed slotted cam. The pawl is formed with tab members extending into the slotted cam means and a heel member extending towards and capable of directly engaging the respective teeth of the ratchet gear. At the ends of the slotted cam are formed bearing recesses into either of which the pawl's tabs can be selectively placed, depending on whether tightening or slackening of the associated flexible tie member is desired. Also loosely supported by the handle is a spring member which continuously urges the pawl's heel into engagement with the ratchet gear yet without the latter being moved from its preselected position, a factor which is especially important during indexing stroke handle movements.

Once the pawl's tabs are placed into position adjacent a bearing recess, the loadbinder's handle can be operated with normal oscillating or swinging movements to rotate the loadbinder's threaded barrel — to which well known threaded eye-hooks and a flexible tie member are connected — thereby to obtain the desired load tightening or loosening action.

Due to the fact that the bering recesses are integrally formed on the handle and because the spring member urges the pawl's heel into ready engagement with the gear's teeth, the pawl's tab members are instantly forcibly interposed between the recesses and the gear teeth as a working stroke handle movement is initiated. Further, the instant an indexing stroke handle movement begins, the combination affect of the spring continuously urging a pawl-to-gear engagement and the tendency of the slotted cam's special cam surface to prohibit inadvertent pawl movement away from the preselected operating position, maintains the pawl at a position ready for the next semi-rotational working stroke of the handle.

The present invention's unique structural cooperation and operating characteristics eliminates unnecessary parts and operating disadvantages found in prior art devices. More particularly, the extreme loads placed on the springs of the prior art loadbinders are not produced in the structure of this invention and thus spring breakage is reduced. Further, because of the fact that the pawl heel of the present invention can be situated at a larger tangential angle to the ratchet gear than that found in prior art single pawl loadbinder devices, there are mostly compressive forces placed on the ratchet gear's teeth, rather than the detrimental bending forces found in many prior art structures.

Accordingly, it is a principal object of this invention to provide a ratchet loadbinder with a selectively reversible and free-floating single pawl member continuously biased into operating position between the ratchet gear and bearing recesses on the loadbinder's handle.

A further object of the present invention is to provide a single pawl ratchet loadbinder having few working parts resulting in greater strength and structural rigidity.

Another object of this invention is to provide ratcheting structure for a turnbuckle wherein more desirable operating loads are placed on the spring element and the ratchet gear.

A still further object of the invention is to provide a ratchet loadbinder utilizing special cam structure and a spring member to prohibit inadvertent movements of the pre-positioned pawl during indexing stroke handle movements.

The means by which the foregoing and other objects of the present invention are accomplished and the manner of their accomplishment will be readily understood from the following specification with reference to the accompanying drawings, in which:

FIG. 1 is a front elevational view of the type ratchet loadbinder with which the present invention is utilized;

FIG. 2 is a fragmented side sectional view of the ratcheting components of the loadbinder depicted in FIG. 1, taken substantially along vantage line 2—2 in FIG. 4 showing the preferred form of the handle, ratchet mechanism, and screw-threaded barrel of the invention disclosed herein, and further showing the pawl member (in solid lines) in an indexing position;

FIG. 3 is similar to FIG. 2, but showing the pawl of the preferred form of this invention reversed to the operating position opposite that shown in FIG. 2, and also showing the same engaged in a working position;

FIG. 4 is a front sectional view of the ratcheting structure shown in FIGS. 2 and 3, taken substantially at the position indicated at line 4—4 in FIG. 2; and FIG. 5 is a perspective view of the preferred form of spring element used in this invention in its unbiased state.

DESCRIPTION OF THE PREFERRED EMBODIMENT

Having reference to the drawings, wherein like characters of reference indicate corresponding elements throughout the several views, there is shown a form of the invention which is presently preferred, it being understood, however, that this invention is not necessarily limited to the precise arrangements that are there shown. Reference numbers bearing prime marks indicate elements of similar construction, but separate location, from those elements referenced by corresponding unprimed numerals.

Illustrated in FIG. 1 is a ratchet loadbinder, denoted generally by reference numeral 20, generally comprising a flexible or articulated tie member — here shown as a chain 22 — wrapped about a load to be secured (not shown); a pair of grab hooks 24, 24' respectively connected by links 26, 26' to right and left-hand threaded eye hooks 28, 30 which, in turn, are respectively threaded into the threaded ends 32, 34 of a sleeve or barrel 36; a toothed ratchet wheel or gear 38 rigidly connected by pin 40 to the barrel 36 at a point intermediate its ends 32, 34; a pawl member generally denoted by reference numeral 42; a spring 43; and a handle 44 having a grip portion 46 and a relatively thick portion 48 which terminates in two bifurcated end portions 50, 50' through which the handle 44 is rotatably connected to barrel 36, as will be more fully explained later herein.

Turning to FIG. 2 there is seen a fragmented side view of the ratchet mechanism, generally denoted by reference numeral 52, of loadbinder 20. Formed integrally through the thick handle portion 48 and also through each of handle end portions 50, 50' is a slotted cam 54 having bearing recesses 56, 56' formed on an outer wall 58 of the slotted cam 54, and a raised cam surface 60 formed centrally of an inner wall 62 of slotted cam 54. The raised cam surface 60, which protrudes upwardly into slotted cam 54, is formed with a special curvature the purpose of which will be described later herein. As best seen in FIGS. 2 and 4, the spring 43 — itself shown in FIG. 5 in its unbiased natural configuration — is loosely carried by the handle 44 in an operating position adjacent, but slightly inwardly of, slotted cam 54 by pins 64, 64' which respectively pass through spring retainer flanges 66, 66' the latter being formed on each end of the spring 43. The pins 64, 64' are secured to the handle 44 by an interference fit with mating holes (not shown) formed in each handle end portion 50, 50'.

The pawl member 42 comprises two tab members 68, 68' and a heel member 70. Midway between the tabs 68, 68' is formed a slot 72 within which rides a neck portion 74 of spring 43. The respective upper edges 76, 76' of pawl tabs 68, 68' are formed with such a radius as to be capable of establishing a relative point-bearing engagement with either of bearing recesses 56, 56' (FIG. 3). Similarly, a radius is formed along the extended edge 78 of the pawl heel 70 to also establish a point-bearing relationship with the face of a respective tooth 80 of the ratchet gear 38 (FIG. 3). It will be appreciated by those skilled in the art that the provision of such radii permits the resiliently-biased, free-floating pawl 42 to be self-locating with respect to its cooperating and mating parts. This is of special importance when considering the unfavorable tolerances present in forging operations — the latter being a preferred method of fabricating the handle of the illustrated preferred embodiment.

It will be noted that the pawl member 42 is capable of a limited but continuously biased travel due to the combined facts that the pawl tabs 68, 68' are retained downwardly by the cam surfaces 60, 60', i.e., in the direction towards the barrel 36 (FIGS. 2, 3, and 4); that the tabs 68, 68' are similarly retained in an upwardly direction by either the outer wall 58 or the bearing recesses 56, 56' of slotted cam 54; and that the pawl 42 itself is resiliently retained in a downward direction due to the biasing action of the neck portion 74 of spring 43, seated within the pawl slot 72. Stated another way, the pawl 42 can move from its central position (shown in phantom in FIG. 2) to either an indexing position (as indicated in solid lines in FIG. 2) or to a working position (as depicted in solid lines in FIG. 3). Additionally, it will be understood that the pawl 42 can assume either a working or indexing position adjacent either of bearing recess, 56, 56', depending on the particular preselected positioning and handle movement involved.

Turning now to FIG. 4, there is shown a fragmented front sectional view of the preferred form of the ratcheting mechanism of this invention. It will be remembered that the gear 38 is rigidly fastened to barrel 36 by pin 40. Further, the barrel 36 is of a slightly smaller diameter than a pair of holes 82, 82' respectively formed in handle ends 50, 50' and through which holes is inserted the barrel 36. Accordingly, the handle 44 is pivotally mounted on the barrel 36 and operable to move arcuately in a plane normal to it while still being maintained laterally outward of the barrel 36 at the relative midpoint thereof.

In use, the loadbinder 20 is loosely connected to a mating flexible tie member 22, as shown in FIG. 1. The operating mode of the ratcheting mechanism 52, i.e., a tightening or slackening action, is selected by manually moving the pawl 42 — such as by tabs 68, 68' — to the desired position adjacent a bearing recess, such as recess 56' as seen in FIGS. 2 and 4. The pawl is now in position to begin its respective working and indexing functions as oscillating handle manipulations commence.

As best seen in FIG. 2, no matter at what rotational speed, within limits, the manipulation of handle 44 occurs, the pawl 42 is maintained in a position ready to instantly recover from its loosely biased or relatively floating position and resume its working position, i.e., to be forcibly interposed between the teeth of ratchet gear 38 and a bearing recess 56, 56'. This minimization of lost motion in the movement of pawl 42, i.e., the relative maintenance of the indexing position of pawl 42 against both the spring 43 and the extreme curvature of the cam surfaces 60, 60'. This curvature is of such an extent that the relative dynamic forces operating on pawl 42 — during handle movements — do not overcome the respective biasing and friction forces between the pawl 42 and both the spring neck 74 and the cam surfaces 60, 60'. Hence, there is no tendency for the pawl 42 to creep towards or inadvertently flip over to the opposite and undesired operating position, even when under extremely fast indexing strokes of the handle (in direction of dotted arrow in FIG. 2). In this connection, it is to be noted that, due to the unique construction of the ratcheting components of this invention, there are no particularly extreme stresses placed on spring 43 as is the case with the springs of many prior art ratchet loadbinders. The relative flex capabilities of spring 43 can be noted from two of its positions as shown in FIGS. 2 and 3.

If, after the loadbinder 20 has drawn the chain 22 snug, it is desired to loosen it, the operator need only manually flip the pawl tabs 68, 68' to the other operating position and, by resuming oscillating handle manipulations, the chain is loosened.

As will be noted in FIG. 3, the particular construction of the preferred embodiment allows the line of forces transmitted from the rotating handle 44, through the pawl 42 (which is relatively point-loaded at either end) and through the face of a tooth 80 of gear 38 (as depicted by the arrow in FIG. 3) to create compression forces in the respective gear tooth. This is in contrast to many prior art devices where, due to a more tangential line of force loading between pawl heel members and ratchet gears, undesirable tensile forces were created in the gear teeth. Accordingly, with the present invention overall gear stresses are more desirable and teeth breakage is less frequent.

From the foregoing, it is believed that those skilled in the art will readily appreciate the unique features and advantages of the present invention over previous types of ratcheting mechanisms for ratchet loadbinders and turnbuckles. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

The embodiments of the invention in which an exclusive property or privilege is claimed are defined as follows:

1. In a ratchet-type load binder of the type having a screw threaded barrel, a ratchet gear rigidly fixed intermediate the ends of the barrel, and a handle operable by oscillating movement to rotate the barrel, the improvement comprising: an arcuate slot integrally defined on the load binder's handle; bearing recess means formed at each end of said arcuate slot; a cam surface defined on said slot intermediate said bearing recess means; selectively reversible pawl means freely carried by said handle and operable to be selectively positioned adjacent either bearing recess means, said pawl means being characterized by having tab means, extending into said slot, operable to forcibly engage a selected said bearing recess means during working stroke handle movements, said pawl means being further characterized by heel means extending towards said toothed ratchet gear; and spring means carried by said handle operable to resiliently bias said pawl means to urge engagement of said heel means with said ratchet gear and to urge engagement of said tab means with said cam surface during indexing stroke handle movements thereby preventing the movement of said tab means from one bearing recess means to the other during said indexing stroke.

2. The invention of claim 1, and wherein said pawl means comprises a single member confined within said slot.

* * * * *